US008387569B2

(12) United States Patent  (10) Patent No.: US 8,387,569 B2
Davis  (45) Date of Patent: Mar. 5, 2013

(54) RAPTOR PERCH APPARATUS AND SYSTEM

(76) Inventor: Kenneth S. Davis, Fresno, CA (US)

(*) Notice: Subject to any disclaimer, the term of this patent is extended or adjusted under 35 U.S.C. 154(b) by 707 days.

(21) Appl. No.: 12/321,801

(22) Filed: Jan. 26, 2009

(65) Prior Publication Data
US 2009/0188437 A1 Jul. 30, 2009

Related U.S. Application Data

(60) Provisional application No. 61/062,181, filed on Jan. 24, 2008.

(51) Int. Cl.
A01K 31/12 (2006.01)
(52) U.S. Cl. ...................................................... 119/531
(58) Field of Classification Search .................. 119/903, 119/61.3, 468, 531, 537; 52/101; 174/138 E, 174/138 F; 47/47; 211/1.3, 197, 172, 85.24, 211/196, 205, 107, 166
See application file for complete search history.

(56) References Cited

U.S. PATENT DOCUMENTS

| | | | | | |
|---|---|---|---|---|---|
| 235,008 | A | * | 11/1880 | Palmer | 211/166 |
| 819,204 | A | * | 5/1906 | Buckingham | 119/531 |
| 1,037,111 | A | * | 8/1912 | Bethel | 441/1 |
| 1,232,982 | A | * | 7/1917 | Scheidt | 211/209 |
| 1,685,663 | A | | 9/1928 | Austin | |
| 3,013,584 | A | * | 12/1961 | Reed et al. | 138/145 |
| 3,319,332 | A | * | 5/1967 | Finger et al. | 29/450 |
| 4,074,653 | A | * | 2/1978 | Pember | 116/22 A |
| 4,110,943 | A | * | 9/1978 | Carlson | 52/101 |
| 4,143,437 | A | * | 3/1979 | Voykin | 441/1 |
| 4,359,844 | A | | 11/1982 | Hoggard et al. | |
| 4,610,364 | A | * | 9/1986 | Meade | 211/183 |
| 5,092,088 | A | | 3/1992 | Way | |
| 5,299,528 | A | | 4/1994 | Blankenship | |
| 5,648,641 | A | * | 7/1997 | Guthrie | 174/139 |
| 5,661,946 | A | | 9/1997 | Davis | |
| 5,709,057 | A | * | 1/1998 | Johnson et al. | 52/301 |
| 6,257,537 | B1 | | 7/2001 | Williams | |
| 6,402,107 | B1 | | 6/2002 | Chervick et al. | |
| 6,640,506 | B2 | | 11/2003 | Landers | |
| 7,196,265 | B2 | | 3/2007 | Spencer | |
| 2005/0034884 | A1 | * | 2/2005 | Lee | 174/5 R |

OTHER PUBLICATIONS

Avian Power Line Interaction Committee (APLIC), 2006; Suggested Practices for Avian Protection on Power Lines: The State of the Art in 2006; Edison Electric Institute, APLIC, and the California Energy Commission; Washington, D. C. and Sacramento, CA; Chapter 6.
The Edison Electric Institute's Avian Power Line Interaction Committee (APLIC) and U.S. Fish and Wildlife Service (USFWS), Apr. 2005; Avian Protection Plan (APP) Guidelines; pp. 43-44, 62-63.

* cited by examiner

Primary Examiner — Kristen C Hayes
(74) Attorney, Agent, or Firm — Marcus N. DiBuduo

(57) ABSTRACT

A raptor perch apparatus for use at the top of a power pole for raptors to perch and nest without contacting the power lines supported by the power pole. In a preferred embodiment, the apparatus comprises a hub bracket having a center member received over the top of the power pole and a plurality of socket-like lateral brackets extending outwardly from the center member to support a plurality of lateral support members extending outwardly from the pole, preferably at a slight upward angle. The proximal end of the lateral support members is received in the lateral brackets. A guy wire or the like is received through a ring member on an end cap at the distal end of each lateral support member to circumvent the distal ends thereof. If needed, a pole top extension can be used to raise the apparatus above the top of the power pole.

19 Claims, 4 Drawing Sheets

RAPTOR PERCH APPARATUS AND SYSTEM

CROSS-REFERENCE TO RELATED APPLICATIONS

This patent application claims priority to U.S. Provisional Patent Application No. 61/062,181 filed Jan. 24, 2008.

STATEMENT REGARDING FEDERALLY SPONSORED RESEARCH

Not Applicable.

BACKGROUND OF THE INVENTION

A. Field of the Invention

The field of the present invention relates generally to apparatuses and systems for supporting and protecting birds that rest or nest on power poles or the like. In particular, the present invention relates to such apparatuses and systems that are beneficially configured as perches for birds of prey that rest and form nests on electrical power poles having one or more electrical power lines. Even more particularly, this invention relates to such apparatuses and systems that allow the birds of prey to perch and form nests safely above the power lines to avoid injury to the birds and damage to the power lines or electrical system.

B. Background

Power lines cross the United States and many countries delivering electrical power to many millions of people. These power lines are typically supported above the ground by power poles that have a lower end inserted into the ground and an upper end having one or more cross-members which extend outwardly from the power pole to support power lines that run generally parallel on both sides of the power pole. Very often these power poles become places for birds to perch. Large birds of prey, which are also know as raptors, commonly utilize the upper portion of power poles to perch while they search for food and as a location to form their nests. Unfortunately, while entering or exiting the perch area the raptor's wings can touch the power lines and result in electrocution of the raptor and interference of the delivery of electricity along the power lines. As well known in the electrical industry, this is a particular problem for the larger sized raptors, such as eagles and hawks, that can have very wide wingspans. Many of these raptors, some of which are endangered species, are protected by federal and state laws that require electrical utility companies and others to take affirmative action to protect the birds and impose civil and/or criminal penalties on persons who injure or kill one of the protected birds. Some species of raptors are also protected under one more international treaties.

In addition to harm to the raptors that arises from contacting the power lines, contact by raptors and the nests formed by the raptors, particularly the larger raptors, can interfere with the steady delivery of electricity by the utility company. As a result of the need to protect the birds and to ensure reliable electricity supply, electrical power crews commonly climb or otherwise get to the top of a power pole and remove raptor nests in an effort to protect the raptors from harm and to improve delivery of electricity along the power lines. The work of removing nests can be hazardous to the raptors, if not done properly, and can cause injury to the crews who do the work. In addition, the labor and material costs to remove raptor nests on a regular basis and to repair damage to electrical supply systems caused by raptors can be somewhat substantial for a utility company or others, including government agencies, whose responsibility is to protect the raptors and provide electricity.

A number of prior art systems are available for protecting birds or other animals from contacting power lines so as to protect the animal from injury and prevent disruption of electricity supply. For instance, U.S. Pat. No. 5,299,528 to Blankenship describes a raptor protection unit for use on a power pole comprising a clamp system that attaches to a power pole cross-member and supports a perch above the cross-member and power lines. The clamp system has a L-shaped side-lock that exerts pressure against a stationary C-shaped brace that braces against the top, a side and the bottom of the cross-member. A perch and/or a perch guard, which prevents the raptor from perching on the cross-member, are attached to the side-lock clamps. The perch shown and described is not suitable for nesting. The Blankenship patent also describes a raptor guard by Pacer Industries that attaches to the power pole cross-member with a pair of opposing clamp members to support a perch guard devoid of horizontal outside edges, to prevent perching thereon, above the cross-member to discourage birds from landing on the cross-member. U.S. Pat. No. 7,196,265 to Spencer describes a raptor guard system comprising a saddle that fits over a power pole cross-member to support an X-shaped deterrent extension in an upwardly protruding relation to the cross-member to deter raptors, both physically and visually, from perching or nesting on the cross-member. U.S. Pat. No. 6,257,537 to Williams and U.S. Pat. No. 6,402,107 to Chervick, et al., both of which were assigned at issue to Falcon Enterprises, LLC of Evanston, Wy., describe a mounting bracket and raptor perch guard that comprises a clamp which attaches to a cross-member or other structural member of a power pole and a perch guard that attaches to the top of the clamp. The clamps utilize self-closing brackets that have a lower member which rotatably attaches to an upper member to engage the cross-member therein. The perch guard is a generally triangular-shaped structure that is configured to prevent a bird from landing on the cross-member or extending its wingspan in a manner that contacts adjacent electrical insulators or the like. U.S. Pat. No. 4,359,844 to Hoggard, et al. describes a bird protection apparatus having a clamp that clamps to the cross-member to support a perch guard that is similarly configured to the Falcon Enterprises patents described above. U.S. Pat. No. 6,640, 506 to Landers describes a bird deterrent apparatus that comprises a tubular-shaped base which attaches to the top of a pole, a post which extends upward from the base and a plurality of moveable, spaced apart fingers that extend downwardly from the top of the post to prevent birds from roosting on the pole.

While the foregoing prior art raptor perch systems and perch guards have had some success in reducing injuries to and the killing of raptors and other birds, they are generally not useful for the raptor to safely nest on the power pole. As known to those skilled in the art, in many areas power poles (despite their present danger) is the safest place for raptors to perch and nest due to the height above the ground and the ability to survey the nearby area for mice and other food. Each of the prior art raptor perch systems or perch guards, except that described in the Landers patent, attach to the cross-member of the power pole, which often does not safely allow a larger sized raptor to perch on the power pole. The prior art patents that merely deter birds from landing and roosting, including the Landers patent, do not address the need for a safe location for the raptors to perch and/or nest. What is needed, therefore, is an improved raptor perch system that allows raptors to safely perch and nest on electrical power poles. The preferred raptor perch system should be configured to position the perch and/or nesting area safely above the power lines and other electrically charged components on the power pole. Preferably, such as systems is easily adapted to existing power poles, is relatively inexpensive to manufacture and relatively easy to install.

SUMMARY OF THE INVENTION

The improved raptor perch apparatus and system of the present invention provides the benefits and solves the problems identified above. That is to say, the present invention discloses a raptor perch apparatus and system that is specifically configured to allow raptors to safely perch and nest at the top of a power pole above the power lines supported by the cross-members. As set forth in more detail below, the raptor perch apparatus of the present invention provides a place for a raptor to perch and form a nest above electrical power lines in a manner that substantially reduces the likelihood the raptor will contact the power lines while entering or leaving the perch area and substantially reduces the likelihood that the raptor's nest will interfere with the electrical distribution along the power lines. The present raptor perch system is adaptable for a variety of different sizes of raptors and a variety of different sizes of power poles and the like. In the preferred embodiment of the present invention, the raptor perch system is readily adaptable to existing power poles, relatively inexpensive to manufacture and relatively easy to install.

In a primary embodiment of the present invention, the raptor perch apparatus and system comprises a hub apparatus that attaches to the top end of a power pole, a plurality of lateral support members extending outwardly from the hub apparatus and a lateral end connecting mechanism that connects the lateral ends of adjacent lateral support members or to interconnect the lateral ends of each of the lateral support members so as to circumvent the lateral ends thereof. The hub bracket has a center member with a socket-like center cavity that is received over the top end of the power pole and a plurality of socket-like lateral support brackets that attach to and extend outwardly from the center member. The proximal end of one of the lateral support members is received in one of the lateral support brackets such that the distal ends of each of lateral support members extend outwardly from the pole. In a preferred configuration, the lateral support members have a slight upward angle to provide improved support for the raptor perch apparatus. Preferably, the lateral ends of each of the lateral support members are interconnected to provide additional support for the raptor perch apparatus, particularly when configured for large raptors such as certain eagles and hawks. In one of the preferred embodiments, the lateral end connecting mechanism comprises an end cap at the distal end of each lateral support member, a ring member at the outward end of the end cap and one or more distal support members that connects the ring members of adjacent lateral support members. In a preferred embodiment, the distal support member is a single guy wire or like wire that passes through each of the ring members to circumvent the distal ends of the lateral support members. A turnbuckle or the like is utilized to adjustably join the ends of the guy wire so the user can tighten or loosen the apparatus as desired. In a typical use, the center member of the hub bracket is received directly on the top end of the power pole to dispose the lateral support members in spaced apart relation to the power lines supported by the power pole in order to provide a place for a raptor to perch and nest without contacting the power lines. In an alternative embodiment, which utilized when the power lines are too close to the top end of the power pole, a pole top extension is attached to the top end of the power pole to provide additional space for the raptors to perch or nest. In this embodiment, the center member of the hub bracket is received over an upwardly extending extension bayonet that is clamped to the upper section of the power pole. In this manner, the raptor perch apparatus of the present invention is adaptable to a wide variety of power poles and the like.

Accordingly, one of the primary aspects of the present invention is to provide a raptor perch apparatus and system that has the various advantages discussed above and overcomes the disadvantages and limitations associated with presently available raptor perch apparatuses and systems.

It is an important aspect of the present invention to provide a raptor perch apparatus that attaches to the top end of a power pole or the like to provide a safe location for a raptor to perch and/or nest.

It is also an important aspect of the present invention to provide a raptor perch apparatus that attaches to a power pole or the like in a manner that allows a raptor, including larger sized raptors, to perch and/or nest without risk of contacting power lines or other electrically energized components.

It is also an important aspect of the present invention to provide a raptor perch apparatus having a hub bracket that attaches to the top of a power pole or to an extension bayonet extending upwardly from the pole, a plurality of lateral support members that extend outwardly from the hub bracket and a distal support member that interconnects the distal ends of the support members to provide a safe location for a bird, particularly large raptors, to perch and nest.

Another important aspect of the present invention is to provide a raptor perch system comprising a power pole or the like having one or more cross-members having electrically energized lines attached thereto, a hub bracket attached to the top of a power pole, a plurality of outwardly extending lateral support members that are each attached to the hub bracket by a lateral bracket having a plurality of lateral brackets and a wire member that interconnects the distal ends of the support members.

Yet another important aspect of the present invention is to provide a raptor perch apparatus and system that provides a perching and/or nesting area for raptors on a power pole which reduces the risk of the raptors contacting the electrically energized components on the power pole.

Yet another important aspect of the present invention is to provide a raptor perch apparatus and system that provides a safe location for raptors to perch and/or next which is readily adaptable to existing power poles, relatively inexpensive to manufacture and relatively easy to install.

The above and other aspects and advantages of the present invention are explained in greater detail by reference to the attached figures and the description of the preferred embodiment which follows. As set forth herein, the present invention resides in the novel features of form, construction, mode of operation and combination of the above presently described and understood by the claims.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The accompanying figures are merely illustrative of one or more of the preferred embodiments and, as such, represent one or more ways of configuring the present invention. Although specific components, materials, configurations and uses are illustrated, it should be understood that a number of variations to the components and to the configuration of those components described herein and in the accompanying figures can be made without changing the scope and function of the invention set forth herein. For instance, although the figures and description provided herein show certain uses and configurations for the raptor perch system of the present invention, those who are skilled in the art will readily understand that this is merely for purposes of simplifying the present disclosure and that the present invention is not so limited.

Figure 1:
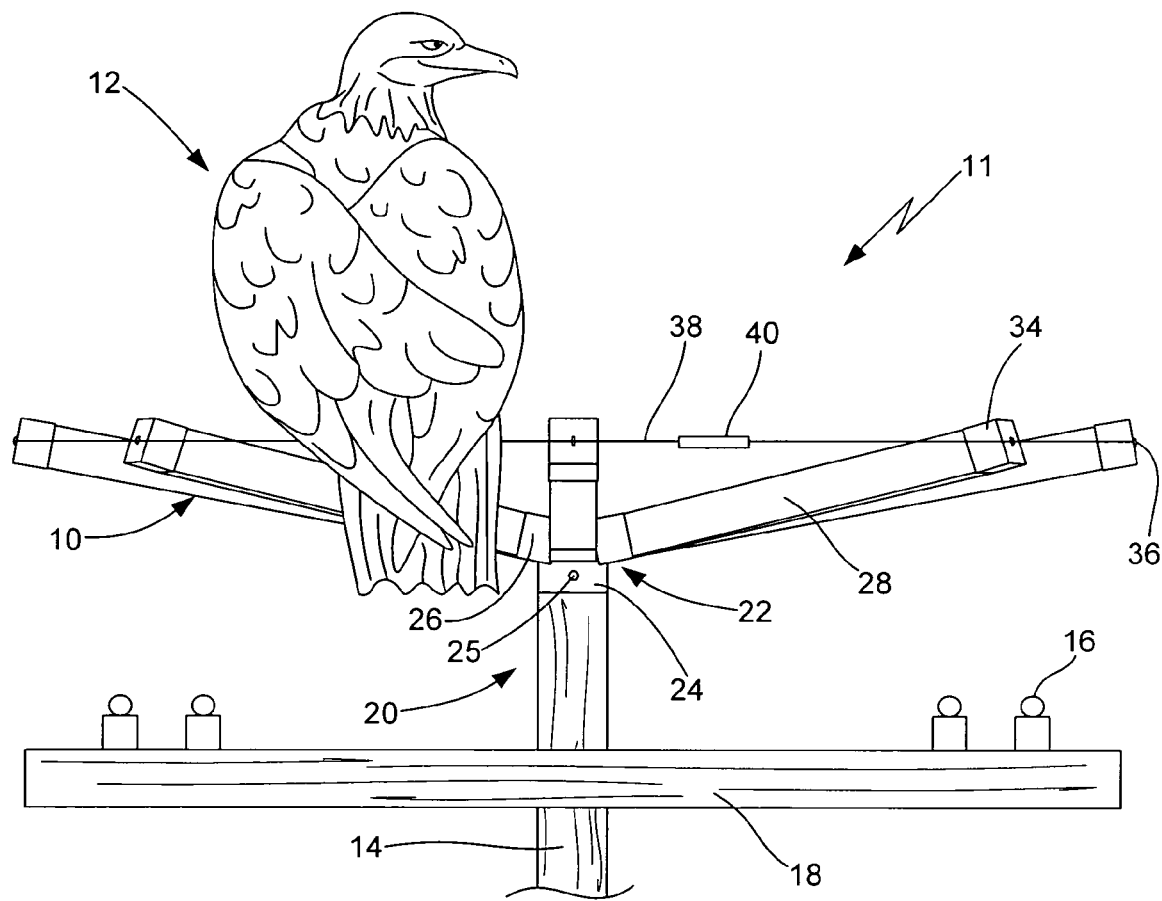
FIG. 1 is a side view a raptor perch system configured according to a preferred embodiment of the present invention with a preferred raptor perch apparatus attached to the top end of a power pole shown with a raptor perched on the raptor perch apparatus.
Figure 2:
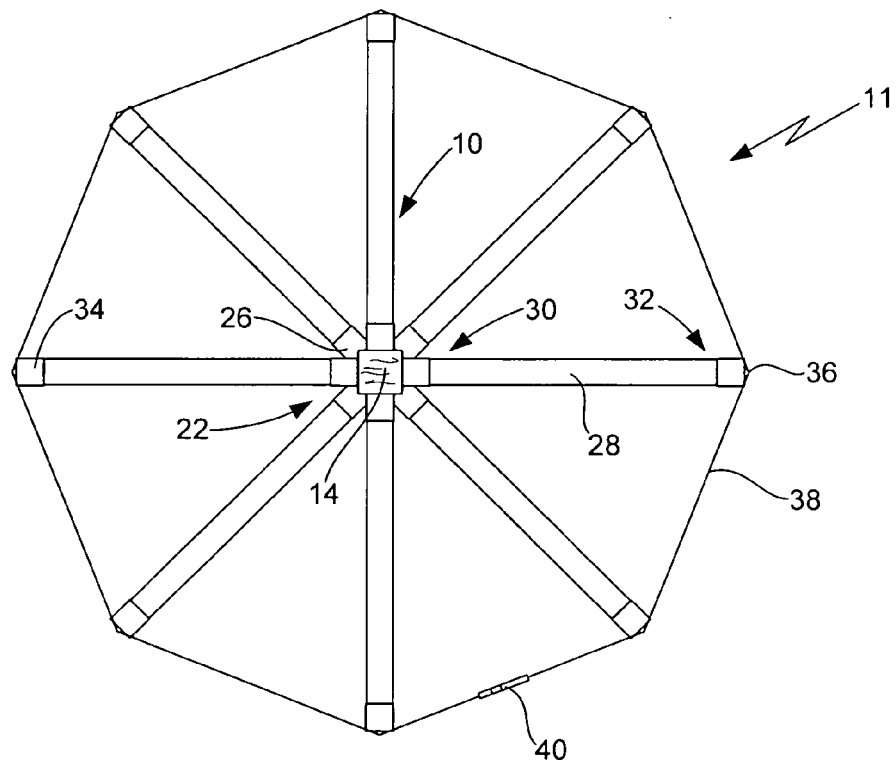
FIG. 2 is a top view of the raptor perch system shown in FIG. 1.

A raptor perch apparatus that is configured pursuant to a preferred embodiment of the present invention is shown generally as 10 in FIGS. 1 through 4. As shown in FIG. 1, raptor perch apparatus 10 is utilized as part of a raptor perch system that is configured to safely allow a raptor 12 to perch and/or form a nest on a power pole 14 above the electrical transmission or power lines 16 that are supported by cross-members 18 located near the upper section 20 of power pole 14. The raptor perch system 11 of FIGS. 1 and 2 is shown installed on a power pole 14 having an upper section 20 with sufficient pole length above the power lines 16 to place raptor perch apparatus 10 such that the raptor 12 can safely perch and/or nest thereon. In such an installation raptor perch apparatus 10 is attached directly to the top end 21 (shown in FIGS. 3 and 5) of power pole 14, which can have a round, square, rectangular or other cross-section.

Figure 3:
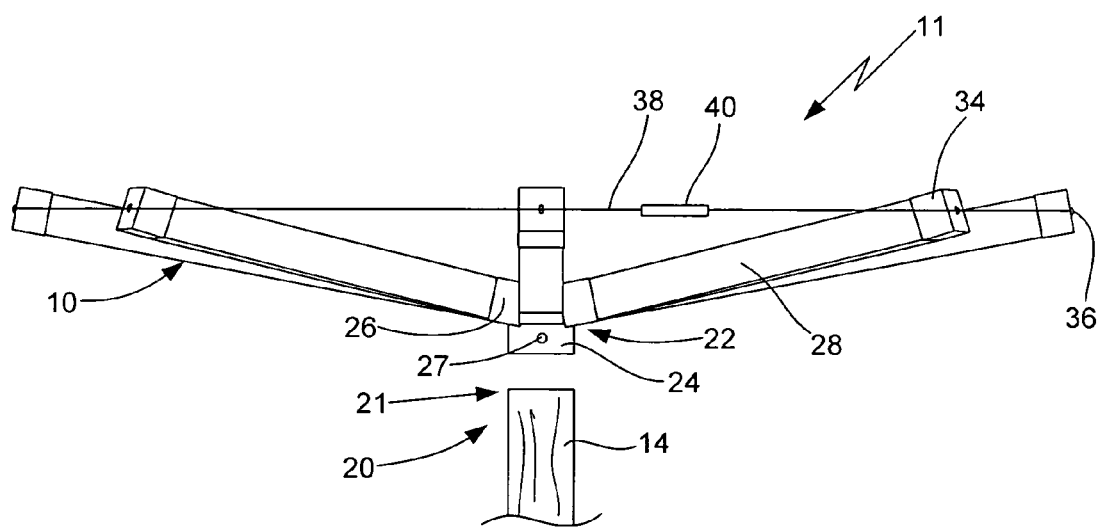
FIG. 3 is a side view of the raptor perch apparatus of FIG. 1 shown in spaced apart relation to the top end of the pole of FIG. 1.

As shown in FIGS. 1 through 4, the raptor perch apparatus 10 of the present invention generally comprises a hub bracket 22 that is mounted to top end 21 of power pole 14. In a preferred embodiment, hub bracket 22 is made out of an alloy steel material having galvanized plating, which provides a hub bracket 22 that is sufficiently strong to support raptor perch system 10 and one or more raptors 12 that may rest or nest thereon. As well known to those skilled in the art, a wide variety of other materials, including other metals, composites and the like, will provide the strength and corrosion resistance desired for the components of the present invention. Hub bracket 22 has a center member 24 that is sized and configured such that top end 21 of power pole 14 will fit within a center cavity 23 (FIG. 4), preferably snugly, of center member 24 in a manner similar to a socket or cap being placed on the top end 21 of power pole 14. Alternatively, the center section 24 can be attached to the top end 21 of power pole 14 utilizing screws, nails and/or other conventional connectors 25 which are inserted through one or more previously provided (preferably) apertures 27, as shown in FIG. 3 in center member 24. Generally, if power pole 14 is made out of wood, the user may want to avoid putting holes in the wood and the use of connectors 25 through the holes due to problems such holes may cause. These problems include splitting at the stress points, providing a place for rotting to occur and hole enlargement from the expansion and contraction due to snow and/or ice in the holes.

Figure 4:
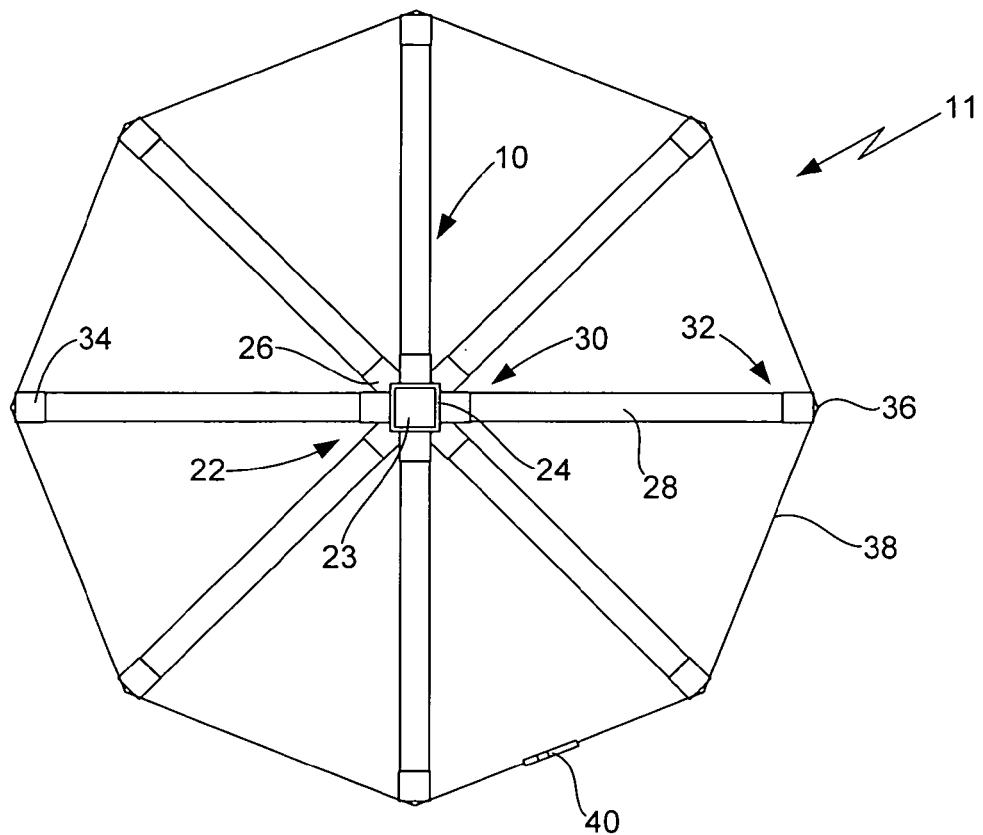
FIG. 4 is a bottom view of the raptor perch apparatus of FIG. 3.

Hub bracket 22 also comprises a plurality of outwardly extending lateral brackets 26, attached to or integral with center member 24, that are each sized and configured to receive and support one of the lateral support members 28 that extend outwardly from hub bracket 22. In a preferred embodiment, the lateral brackets 26 are configured generally similar to a socket or in a socket-like configuration and are welded to center member 24 to form hub bracket 22. As shown in FIGS. 2 and 4, the lateral brackets 26 at the corners of a square center section 24 will be shorter than those along the sides of center section 24 to provide for the use of uniform length lateral support members 28, which is beneficial for connecting the outward ends, as set forth below, of adjacent lateral support members 28.

Lateral support members 28 extend outwardly from hub bracket 22 to provide the desired area for the raptor 12 to perch and/or nest. In a preferred embodiment, the lateral support members 28 extend outwardly and slightly upwardly from hub bracket 22 to better dispose the raptor perch apparatus 10 above the power lines 16, as shown in FIG. 1. In a preferred embodiment, the lateral support members 28 have an upward angle of approximately 10 degrees relative to a generally planar top end 21 of power pole 14. As will be readily appreciated by those skilled in the art, lateral support members 28 can be manufactured in a variety different lengths depending on the size of raptor desired to be protected by the raptor perch apparatus 10. For instance, lateral support members 28 can be four, six, eight or ten feet in length. Naturally, many other lengths are also available. Typically, the size selected for lateral support members 28 should be sufficient for the size of the likely raptor 12 (i.e., a large eagle versus a smaller sized hawk or falcon) that will utilize the raptor perch apparatus 10. As shown in FIG. 2, it is preferred that each of the lateral support members 28 be of the same length to provide a balanced raptor perch system 10 as it sits atop power pole 14. Lateral support members 28 can be made out of a wide variety of different materials, including wood, metal, composites and the like. In one preferred embodiment, the lateral support members 28 are made out of a treated solid Douglas Fir or laminated wood members (beams). In an alternative embodiment, the lateral support members 28 are integral with the lateral brackets 26 or the entire hub bracket 22.

As best shown in FIGS. 2 and 4, the proximal end 30 of each lateral support member 28 is sized and configured to fit within or attach to the lateral brackets 26 of hub bracket 22. Preferably, the proximal ends 30 of lateral support members 28 are cooperatively configured with lateral brackets 26 such that a tight fit is achieved and the use of connectors is avoided. As with the power pole 14, however, the lateral support members 28 can be joined to the lateral brackets 26 with screws, nails, bolts and/or a variety of other connectors (not shown). The preferred configuration for raptor perch apparatus 10 has a lateral end connecting means that connects the distal ends 32 of each of the lateral support members 28. In a preferred embodiment, the lateral end connecting means comprises an end cap 34 placed on the distal end 32 of each lateral support member 28, a ring member 36 attached to or integral with the outward end of end cap 34 and a distal support member, such as guy wire 38, that connects the distal ends 32, at ring members 36, of each lateral support member 28. End cap 34 is placed over the distal end 32 and securely attached thereto with screws, nails, bolts and/or other connectors (not shown). The end caps 34 can be made out of a variety of materials. In a preferred embodiment, the end caps 34 are made out of the same material as the hub bracket 22 (e.g., an alloy steel that is galvanized). In a preferred embodiment the guy wire 38 passes through each of the ring members 36 so as to generally circumvent the raptor perch apparatus 10 at the distal ends 32 of each lateral support member 28, as best shown in FIGS. 2 and 4. A variety of different types of wires can be utilized for guy wire 38. In the preferred embodiment, a single wire is utilized for guy wire 38 and a tensioning device 40, such as a turnbuckle or like device, is used to tighten the guy wire 38 and more securely hold raptor perch system 10 together on top of power pole 14. In an alternative embodiment, a plurality of distal support members 38 can be used to connect ring members 36 of adjacent lateral support members 28. Preferably, each of the plurality of distal support members 38 would be made from a generally stiff, non-elastic material.

Figure 5:
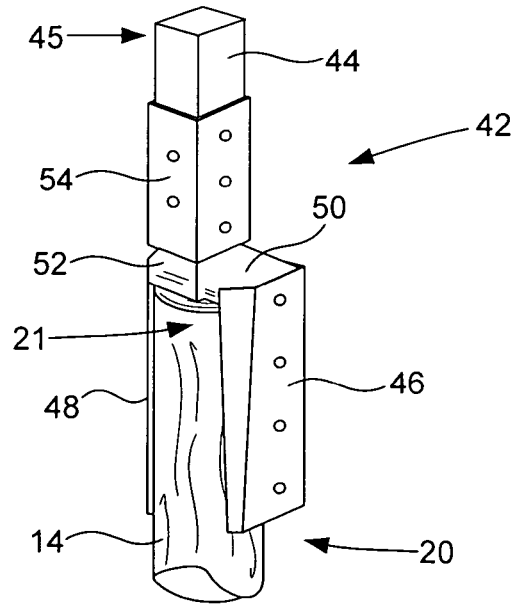
FIG. 5 is a side view of a pole top extension suitable for use with the raptor perch system of the present invention to place the system on top of an existing power pole.
Figure 6:
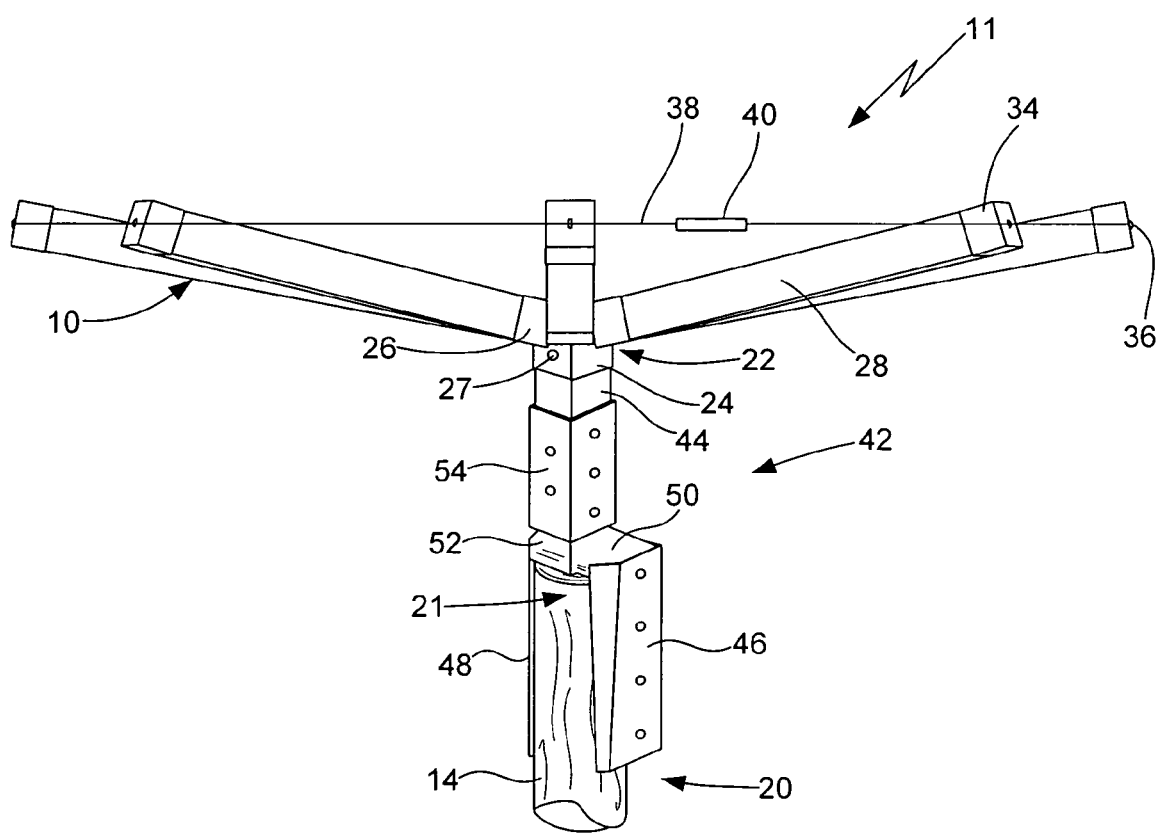
FIG. 6 is a side view of a raptor perch system utilizing the raptor perch apparatus of FIGS. 3 and 4 and the pole top extension of FIG. 5.

Preferably, the various components of the raptor perch apparatus 10 are put together on the ground, utilizing commonly available tools, and then the entire apparatus 10 is placed on the top end 21 of power pole 14 and the center member 24 is secured thereto using one or more connectors 25. As known to those skilled in the art, however, very often the cross-members 18 and, therefore, the electrical power lines 16 are positioned so close to the top end 21 of power pole 14 that there is not sufficient length between top end 21 and power lines 16 for the raptor perch apparatus 10 to be placed in a manner that will safely protect the raptor 12 and its nest. In these configurations, it is preferred that the raptor perch apparatus 10 of the present invention be utilized in conjunction with a pole top extension 42, such as shown in FIGS. 5 and 6. This pole top extension 42 is the subject of U.S. Pat. No. 5,661,946 issued on Sep. 2, 1997 (the "'946 Patent") to the present inventor. The '946 Patent is incorporated by reference herein as though fully set forth herein. As set forth in the '946 Patent, the pole top extension 42 can be placed on top of power pole 14 to extend the upper section 20 of power pole 14 and provide an extension bayonet 44, with a top end 45, that can be utilized with the raptor perch system 10 of the present invention to provide sufficient length to install system 10 above power lines 16. In a preferred embodiment, the pole top extension 42 comprises a pair of bracket members 46 and 48 that attach to power pole 14, matingly interengageable portions 50 and 52 that couple with bracket members 46/48 over the top end 21 of power pole 14 and a rectangular collar 54 that opens upwardly to receive the extension bayonet 44 therein. To install raptor perch apparatus 10 thereon, the center member 24 of hub bracket 22 is attached to extension bayonet 44 with screws, nails, bolts and/or other connectors 25 (as described above). The pole top extension 42 allows retrofit of the raptor perch apparatus 10 to many power poles 14 that may not otherwise be suitable for use of raptor perch apparatus 10.

In another alternative configuration of the present invention, the pole 14 utilized with the raptor perch apparatus 10 can be a relatively short section of a pole, such as a two to four or six foot length of a pole section that is attached to a structure, including those that support power lines 16 or the like, that does not otherwise have an upwardly extending pole or pole-like element that can be utilized as pole 14 with the present invention. As an example, the large metal power structures can be retrofitted with a short pole section that can function as pole 14 with apparatus 10. The short pole 14 can be attached anywhere on the structure where it is safe and convenient to place the raptor perch apparatus 10 so the raptor 12 can perch and/or nest. Various devices can be utilized to attach an upwardly extending pole 14, which can have a round, square, rectangular or other cross-section, to the structure. In this manner, raptor perch apparatus 10 can be utilized on a wide variety of different structures, including buildings.

As set forth above, the raptor perch apparatus 10 of the present invention provides a safe perch for large birds, such as eagles, hawks and other raptors 12, and provides a place for the raptors 12 to nest. The raptor perch system 11, comprising the raptor perch apparatus 10 and power pole 14 (FIGS. 1 and 2) or these two components with pole top extension 42 (FIG. 6), significantly reduces hazardous contact by the raptors 12 against the power lines 16 and allows for nesting without interfering with the power lines 16 or any other electrically charged equipment on power pole 14. Another benefit of the use of raptor perch system 11 is that it allows power line crews to work on the power poles 14 and/or power lines 16 without disturbing any raptor nest, which could be a violation of one or more federal, state or local laws and/or regulations, that may be in place on the raptor perch apparatus. Yet another benefit of the present raptor perch apparatus 10 is that it can be made out of materials such that it will generally blend with the upper section 20 of power pole 14 and the surrounding area so as not to create an eyesore. Use of the raptor perch system 11 will reduce power outages that would otherwise be caused by the wings of large raptors 12 contacting the power lines 16 and will provide for an overall reduction in electrocution deaths of raptors 12.

While there are shown and described herein one or more specific forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there are numerous components described herein that can be replaced with equivalent functioning components to accomplish the objectives of the present invention.

What is claimed is:

1. A raptor perch system comprising:
    a pole supporting at least one power line;
    a hub bracket having a center member for engaging a top end of said pole and a plurality of lateral support brackets extending outwardly from said center member;
    a plurality of lateral support members, each of said plurality of lateral support members having a proximal end attached to one of said plurality of lateral brackets and a distal end extending outwardly from said hub bracket; and
    at least one distal support member joining said distal ends of adjacent lateral support members, wherein said distal support member comprises a wire that circumvents said distal ends of said adjacent lateral support members,
    wherein said raptor perch system is sized and configured to allow a raptor to perch and nest thereon.

2. The raptor perch system according to claim 1, wherein said center member has a center cavity sized and configured to receive said top end of said pole therein.

3. The raptor perch system according to claim 2, wherein said center member is attached to said pole with one or more connectors received through said center member.

4. The raptor perch system according to claim 1, wherein said center member has a center cavity sized and configured to receive an extension bayonet of a pole top extension that is attached to said pole.

5. The raptor perch system according to claim 4, wherein said center member is capable of being attached to said extension bayonet.

6. The raptor perch system according to claim 1, wherein each of said lateral support members are angled generally upward relative to said top end of said pole.

7. The raptor perch system according to claim 1 further comprising a ring member at the distal end of each of said lateral support members, wherein said distal support member interconnects said ring members of said adjacent lateral support members.

8. The raptor perch system according to claim 7, wherein said ring member is attached to or integral with a cap member at the distal end of each of said lateral support members.

9. The raptor perch system according to claim 8, wherein said wire connects said ring members of said cap members of said adjacent lateral support members.

10. A raptor perch system comprising:
a power pole above one or more power lines supported on a cross-member attached to an upper section of said power pole:
a hub bracket having a center member and a plurality of lateral support brackets extending outwardly from said center member;
a plurality of lateral support members, each of said plurality of lateral support members having a proximal end attached to one of said plurality of lateral brackets and a distal end extending outwardly from said hub bracket; and
a lateral end connecting means at said distal end of each of said plurality of lateral support members for connecting the distal ends of adjacent lateral support members, said lateral end connecting means comprising a cap member at the distal end of each of said lateral support members, a ring member attached to or integral with said cap member, and at least one distal support member each connecting said adjacent ring members,
wherein said raptor perch system is sized and configured to allow a raptor to perch and nest thereon above said power lines.

11. The raptor perch system according to claim 10, wherein said center member has a center cavity sized and configured to receive said top end of said power pole therein.

12. The raptor perch system according to claim 10, wherein said center member has a center cavity sized and configured to receive an extension bayonet of a pole top extension attached to said power pole.

13. The raptor perch system according to claim 10, wherein each of said lateral support members are angled generally upward relative to said top end of said pole.

14. The raptor perch system according to claim 10, wherein said distal support member is a wire that connects each of said ring members and circumvents said distal ends of each of said lateral support members.

15. A raptor perch system, comprising:
a power pole having a top end and one or more power lines supported on a cross-member attached to an upper section of said power pole; and
a raptor perch apparatus having a hub bracket, a plurality of lateral support members each having a proximal end at said hub bracket and a distal end extending outward therefrom, and a lateral end connecting means connecting said distal end of each of said lateral support members, said hub bracket having a center member and a plurality of lateral support brackets extending outwardly from said center member, and said lateral end connecting means comprising a cap member at the distal end of each of said lateral support members, a ring member attached to or integral with said cap member, and at least one distal support member connecting each of said adjacent ring members,
wherein said raptor perch apparatus is sized and configured to allow a raptor to perch and nest thereon above said power lines.

16. The raptor perch system according to claim 15, wherein said distal support member is a wire that circumvents said distal ends of each of said lateral support members.

17. A raptor perch system comprising:
a pole supporting at least one power line;
a hub bracket having a center member for engaging a top end of said pole and a plurality of lateral support brackets extending outwardly from said center member;
a plurality of lateral support members, each of said plurality of lateral support members having a proximal end attached to one of said plurality of lateral brackets and a distal end extending outwardly from said hub bracket;
at least one distal support member joining said distal ends of each adjacent lateral support members; and
a ring member at the distal end of each of said lateral support members, wherein at least one of said at least one distal support member interconnects said ring members of each adjacent lateral support member,
wherein said raptor perch system is sized and configured to allow a raptor to perch and nest thereon.

18. The raptor perch system according to claim 17, wherein said ring member is attached to or integral with a cap member at the distal end of each of said lateral support members.

19. The raptor perch system according to claim 18 wherein at least one of said at least one distal support member is a wire that connects each of said ring members and circumvents said distal ends of each of said lateral support members.

* * * * *